(12) United States Patent
Wang et al.

(10) Patent No.: US 12,519,486 B2
(45) Date of Patent: Jan. 6, 2026

(54) DATA PROCESSING METHOD AND APPARATUS

(71) Applicant: HUAWEI TECHNOLOGIES CO., LTD., Guangdong (CN)

(72) Inventors: Zhibing Wang, Shenzhen (CN); Zhenbao Liu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 18/412,995

(22) Filed: Jan. 15, 2024

(65) Prior Publication Data

US 2024/0154623 A1 May 9, 2024

Related U.S. Application Data

(63) Continuation of application No. PCT/CN2022/077413, filed on Feb. 23, 2022.

(30) Foreign Application Priority Data

Aug. 25, 2021 (CN) .......................... 202110978326.1

(51) Int. Cl.
*H03M 7/30* (2006.01)
*G06F 3/06* (2006.01)
*H03M 7/32* (2006.01)

(52) U.S. Cl.
CPC ........ *H03M 7/6088* (2013.01); *G06F 3/0608* (2013.01); *G06F 3/0643* (2013.01); *G06F 3/0649* (2013.01); *G06F 3/0661* (2013.01); *G06F 3/0685* (2013.01); *H03M 7/302* (2013.01); *H03M 7/3066* (2013.01); *H03M 7/6029* (2013.01); *H03M 7/6064* (2013.01)

(58) Field of Classification Search
CPC .. H03M 7/6088; H03M 7/302; H03M 7/3066; H03M 7/6029; H03M 7/6064; G06F 3/0608; G06F 3/0643; G06F 3/0649; G06F 3/0661; G06F 3/0685
USPC ................................................ 341/50, 51, 87
See application file for complete search history.

(56) References Cited

U.S. PATENT DOCUMENTS 8,478,731 B1 * 7/2013 Throop ............... G06F 16/1744
 707/693
8,769,049 B2 * 7/2014 Murphy .............. G06F 11/1464
 707/637

(Continued)

FOREIGN PATENT DOCUMENTS

CN 110099092 A 8/2019
CN 111459895 A 7/2020

*Primary Examiner* — Khai M Nguyen

(57) ABSTRACT

This application provides a data processing method and apparatus. The method is applied to a storage system. The storage system includes a storage apparatus and a processing apparatus. The method is performed by the processing apparatus. The method includes: obtaining a tiered storage feature and a data feature of first data, where the tiered storage feature includes at least one of the following features: an importance, an access frequency, and a retention time, and the data feature includes at least one of the following features: a data type, a data dimension, a data size, or a data content feature; determining a first compression algorithm based on the tiered storage feature and the data feature; and compressing the first data based on the first compression algorithm, to obtain compressed data.

17 Claims, 4 Drawing Sheets

(56) References Cited

U.S. PATENT DOCUMENTS

| | | |
|---|---|---|
| 9,026,505 B1 | 5/2015 | Huang |
| 2017/0212698 A1 | 7/2017 | Bhadauria et al. |
| 2017/0371557 A1 | 12/2017 | Kowles |
| 2021/0132861 A1 | 5/2021 | Liu et al. |

* cited by examiner

DATA PROCESSING METHOD AND APPARATUS

CROSS-REFERENCE TO RELATED APPLICATIONS

This application is a continuation of International Application No. PCT/CN2022/077413, filed on Feb. 23, 2022, which claims priority to Chinese Patent Application No. 202110978326.1, filed on Aug. 25, 2021. The disclosures of the aforementioned applications are hereby incorporated by reference in their entireties.

TECHNICAL FIELD

This application relates to the field of data storage, and more specifically, to a data processing method and apparatus.

BACKGROUND

Unstructured data refers to data that has an irregular or incomplete data structure, that has no predefined data model, and that is inconvenient to represent using a database or a two-dimensional logical table. Currently, massive office documents, HyperText Markup Language (HTML), images, audio and video data, and the like generated by computer information systems all belong to unstructured data. Such data accounts for about 80% of the total data amount. In addition, the data amount of unstructured data continuously grows at a rate of approximately doubling every year.

Although a user may choose to compress data before storing the data, if the data accessed less frequently by the user after the data is stored can be further re-compressed, storage space can be further saved, and storage costs can be reduced.

Currently, re-compression schemes based on the unstructured data are generally limited to several specific algorithms, and require user participation. This requires users to understand related knowledge of data compression. More importantly, the existing re-compression schemes cannot fully meet compression requirements of users for a plurality of types of unstructured data.

Therefore, a data processing method applicable to the plurality of types of unstructured data without requiring user participation is urgently needed.

SUMMARY

This application provides a data processing method and apparatus, to meet re-compression requirements of different types of unstructured data without requiring a user to participate in a data re-compression process, to better save storage space.

According to a first aspect, a data processing method is provided. The method is applied to a storage system. The storage system includes a storage apparatus and a processing apparatus. The method is performed by the processing apparatus. The method includes: obtaining a tiered storage feature and a data feature of first data, where the tiered storage feature includes at least one of the following features: an importance, an access frequency, or a retention time, and the data feature includes at least one of the following features: a data type, a data dimension, a data size, or a data content feature; determining a first compression algorithm based on the tiered storage feature and the data feature; and compressing the first data based on the first compression algorithm, to obtain compressed data.

In an embodiment of this application, the compression algorithm applicable to the first data is sifted based on the tiered storage feature and the data feature of the first data, and the first data is compressed based on the compression algorithm. Through the method, any type of data can be properly compressed without requiring user participation, and re-compression requirements of a plurality of types of unstructured data can be met, so that data in the storage system can be re-compressed (or compressed) more efficiently.

With reference to the first aspect, in some implementations of the first aspect, the determining a first compression algorithm based on the tiered storage feature and the data feature includes: determining a compression algorithm performance parameter based on the tiered storage feature; and determining the first compression algorithm based on the compression algorithm performance parameter and the data feature.

Through determining, based on the tiered storage feature, a performance requirement that the compression algorithm needs to meet, and with reference to the data feature, the first compression algorithm applicable to the first data can be better sifted in this application, so that the re-compression requirements of the plurality of types of unstructured data can be met. This avoids a disadvantage in a re-compression scheme related to a strong compression algorithm in the conventional technology.

With reference to the first aspect, in some implementations of the first aspect, before the determining a first compression algorithm, the method further includes determining, based on the tiered storage feature, that the first data needs to be compressed.

In this application, the tiered storage feature of the first data is determined, and the first data is compressed only when it is determined that the first data needs to be compressed, to avoid compressing the first data when compression is not needed. In this way, a user does not need to choose whether the first data needs to be compressed. This further can help the user determine whether the first data needs to be compressed, thereby avoiding user participation.

With reference to the first aspect, in some implementations of the first aspect, the first data is data that has been compressed, and the compressing the first data based on the first compression algorithm includes: decompressing the first data to obtain intermediate data, and saving a first operation parameter used during the decompression; and compressing the intermediate data based on the first compression algorithm, to obtain the compressed data.

Through the foregoing technical solutions, in this application, the first data is re-compressed without user participation, and the corresponding operation parameter is saved, so that when the user needs to call the first data, the compressed data can be restored to the first data. This avoids damage to the first data.

With reference to the first aspect, in some implementations of the first aspect, the method further includes: decompressing the compressed data to obtain the intermediate data; and compressing the intermediate data based on the first operation parameter, to obtain the first data.

Through the foregoing technical solutions, this application supports restoring the compressed data to the first data. This avoids damage to the first data.

With reference to the first aspect, in some implementations of the first aspect, the method further includes decompressing the compressed data to obtain the first data.

With reference to the first aspect, in some implementations of the first aspect, the method further includes storing the compressed data in the storage apparatus.

Through the foregoing technical solutions, this application can reduce space occupied by data storage.

With reference to the first aspect, in some implementations of the first aspect, the compression algorithm performance parameter includes at least one of the following: a compression ratio or a throughput.

According to a second aspect, a data processing apparatus is provided. The apparatus includes: a file processing module, a compression module, an algorithm selection module, and a storage tiering module. The storage tiering module is configured to obtain a tiered storage feature of first data. The tiered storage feature includes at least one of the following features: an importance, an access frequency, or a retention time. The file processing module is configured to obtain a data feature of the first data. The data feature includes at least one of the following features: a data type, a data dimension, a data size, or a data content feature. The algorithm selection module is configured to determine a first compression algorithm based on the tiered storage feature and the data feature. The compression module is configured to compress the first data based on the first compression algorithm, to obtain compressed data.

With reference to the second aspect, in some implementations of the second aspect, the algorithm selection module is configured to determine a compression algorithm performance parameter based on the tiered storage feature; and determine the first compression algorithm based on the compression algorithm performance parameter and the data feature.

With reference to the second aspect, in some implementations of the second aspect, the storage tiering module is further configured to determine, based on the tiered storage feature, that the first data needs to be compressed.

With reference to the second aspect, in some implementations of the second aspect, the first data is data that has been compressed, and the compression module is configured to decompress the first data to obtain intermediate data, and save a first operation parameter used during the decompression; and compress the intermediate data based on the first compression algorithm, to obtain the compressed data.

With reference to the second aspect, in some implementations of the second aspect, the compression module is further configured to decompress the compressed data to obtain the intermediate data; and compress the intermediate data based on the first operation parameter, to obtain the first data.

With reference to the second aspect, in some implementations of the second aspect, the compression module is further configured to decompress the compressed data to obtain the first data.

With reference to the second aspect, in some implementations of the second aspect, the storage apparatus is configured to store the compressed data.

With reference to the second aspect, in some implementations of the second aspect, the compression algorithm performance parameter includes at least one of the following: a compression ratio or a throughput.

According to a third aspect, a computer-readable storage medium is provided, and stores instructions. When the instructions are run on a computer, the computer is enabled to perform the data processing method according to the first aspect or any one of any possible implementation of the first aspect.

According to a fourth aspect, a computer program product is provided. When the computer program product is run on a computer, the computer is enabled to perform the data processing method according to the first aspect or any one of any possible implementation of the first aspect.

According to a fifth aspect, a computer device is provided. The computer device includes a processor and a memory. The memory is configured to store computer program instructions. The processor executes and calls the computer program instructions in the memory to perform the data processing method according to the first aspect or any one of any possible implementation of the first aspect.

DESCRIPTION OF EMBODIMENTS

The following describes technical solutions of this application with reference to accompanying drawings.

Figure 1:
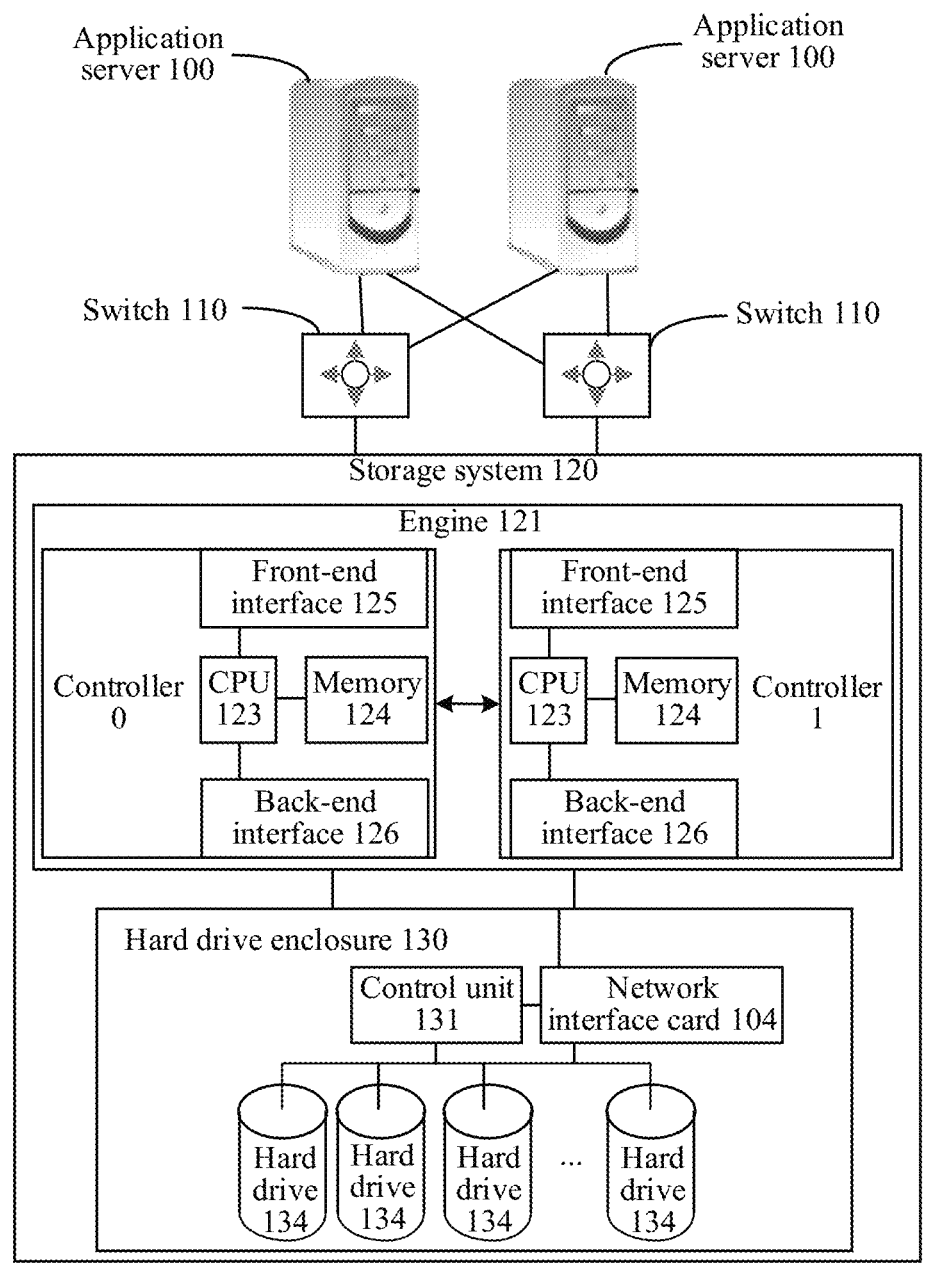
FIG. 1 is a schematic diagram of an application scenario according to this application.

FIG. 1 is a schematic diagram of an application scenario according to this application. In the application scenario shown in FIG. 1, a user accesses data through applications. A computer running these applications is referred to as an "application server". An application server 100 may be a physical machine or a virtual machine. A physical application server includes, but is not limited to, a desktop computer, a server, a notebook computer, and a mobile device. The application server accesses a storage system through a fiber channel switch 110 to access data. However, the switch 110 is merely an optional device, and the application server 100 may also directly communicate with the storage system 120 through a network. Alternatively, the fiber channel switch 110 may be replaced with an Ethernet switch, an InfiniBand switch, a RoCE (RDMA over Converged Ethernet) switch, or the like.

The storage system 120 shown in FIG. 1 is a centralized storage system. The centralized storage system features a unified portal, and all data from an external device passes through this portal. The portal is an engine 121 of the centralized storage system. The engine 121 is a most core component of the centralized storage system, and a plurality of advanced functions of the storage system are implemented herein.

As shown in FIG. 1, the engine 121 has one or more controllers. In FIG. 1, an example in which the engine includes two controllers is used for description. There is a mirror channel between a controller 0 and a controller 1. Therefore, after writing data into a memory 124 of the controller 0, the controller 0 may send a copy of the data to the controller 1 through the mirror channel, and the controller 1 stores the copy in a local memory 124 of the controller 1. In this way, the controller 0 and the controller 1 provide backup for each other. When the controller 0 is fails, the controller 1 may take over a service of the controller 0, and when the controller 1 fails, the controller 0 may take over a service of the controller 1, to prevent a hardware failure from causing unavailability of the entire storage system 120. When four controllers are deployed in the engine 121, a mirror channel exists between any two of the controllers. Therefore, any two of the controllers provide back up for each other.

The engine 121 further includes a front-end interface 125 and a back-end interface 126. The front-end interface 125 is configured to communicate with the application server 100, to provide a storage service for the application server 100. The back-end interface 126 is configured to communicate with a hard drive 134, to expand a capacity of the storage system. The engine 121 may be connected to more hard drives 134 by the back-end interface 126, to form a very large storage resource pool.

In terms of hardware, as shown in FIG. 1, the controller 0 includes at least a processor 123 and the memory 124. The processor 123 is a central processing unit (central processing unit, CPU), is configured to process a data access request from outside the storage system (a server or another storage system), and is also configured to process a request generated inside the storage system. For example, when receiving a data write request sent by the application server 100 through the front-end port 125, the processor 123 temporarily saves data in the data write request in the memory 124. When a total amount of data in the memory 124 reaches a specific threshold, the processor 123 sends the data stored in the memory 124 to the hard drive 134 for persistent storage through a back-end port.

The memory 124 is an internal memory that directly exchanges data with the processor. The memory can read/write the data at a high speed at any time, and serve as a temporary data memory of an operating system or another running program. The memory includes at least two types of memories. For example, the memory may be a random access memory, or may be a read-only memory (read-only memory, ROM). For example, the random access memory may be a dynamic random access memory (dynamic random access memory, DRAM), or a storage class memory (storage class memory, SCM). The DRAM is a semiconductor memory, which is a volatile memory (volatile memory) device like most of the random access memories (random access memories, RAMs). The SCM uses a composite storage technology that combines both a conventional storage apparatus feature and a memory feature. The storage class memory can provide a higher read/write speed than the hard drive, but is slower than the DRAM in terms of an access speed and cheaper than the DRAM in terms of costs. However, the DRAM and the SCM are merely examples for description in this embodiment. The memory may also include another random access memory, for example, a static random access memory (static random access memory, SRAM) or the like. The read-only memory, for example, may be a programmable read-only memory (programmable read only memory, PROM), an erasable programmable read-only memory (erasable programmable read only memory, EPROM), or the like. In addition, the memory 124 may also be a dual in-line memory module (dual in-line memory module, DIMM), to be specific, a module including a dynamic random access memory (DRAM), or may be a solid-state drive (solid-state drive, SSD). In an actual application, a plurality of memories 124 and memories 124 of different types may be configured in the controller 0. A quantity and types of the memories 124 are not limited in this embodiment. In addition, the memory 124 may be configured to have a power-off protection function. The power-off protection function means that when a system is powered off and then powered on again, the data stored in the memory 124 is not lost. A memory with the power-off protection function is referred to as a non-volatile memory.

The memory 124 stores a software program, and the processor 123 may manage the hard drive by running the software program in the memory 124. For example, a hard drive is abstracted into a storage resource pool and then divided into LUNs for a server to use. The LUN herein is actually the hard drive seen on the server. Certainly, some centralized storage systems are also file servers and can provide file sharing services for servers.

A hardware component and a software structure of the controller 1 (and another controller not shown in FIG. 1) are similar to those of the controller 0, and details are not described herein again.

FIG. 1 shows a centralized storage system in which hard drives and controllers are separated. In the system, the engine 121 may not have a hard drive slot. The hard drive 134 needs to be placed in a hard drive enclosure 130, and the back-end interface 126 communicates with the hard drive enclosure 130. The back-end interface 126 exists in the engine 121 in a form of an adapter card, and one engine 121 may connect to a plurality of hard drive enclosures through two or more back-end interfaces 126. Alternatively, the adapter card may also be integrated on a mainboard. In this case, the adapter card may communicate with the processor 112 through a PCIE bus.

It should be noted that FIG. 1 shows only one engine 121. However, in an actual application, the storage system may include two or more engines 121, and redundancy or load balancing is performed between a plurality of engines 121.

The hard drive enclosure 130 includes a control unit 131 and a plurality of hard drives 134. The control unit 131 may have a plurality of forms. In one case, the hard drive enclosure 130 is a smart hard drive enclosure. As shown in FIG. 1, the control unit 131 includes a CPU and a memory. The CPU is configured to perform operations such as address translation and data reading and writing. The memory is configured to temporarily store data that is to be written into the hard drive 134, or read data that is to be sent to the controller from the hard drive 134. In another case, the control unit 131 may be a programmable electronic component, such as a data processing unit (data processing unit, DPU). The DPU has versatility and programmability of the CPU, but is more specialized, and can run efficiently on a network data packet, a storage request, or an analysis request. The DPU is distinguished from the CPU by a high degree of parallelism (which requires processing a large quantity of requests). Optionally, the DPU herein may alternatively be replaced with a processing chip such as a graphics processing unit (graphics processing unit, GPU) or embedded neural-network processing units (neural-network processing units, NPU). Generally, a quantity of the control units 131 may be one, and may alternatively be two or more. When the hard drive enclosure 130 includes at least two control units 131, there may be a belonging relationship between the hard drive 134 and the control units 131. If there is a belonging relationship between the hard drive 134 and the control units 131, each control unit can only access a hard drive that belongs to the control unit. This usually includes forwarding a read/write data request between the control units 131, resulting in a long data access path. In addition, if storage space is insufficient, when a new hard drive 134 is added to the hard drive enclosure 130, a belonging relationship between the hard drive 134 and the control unit 131 needs to be rebound. The operation is complex, and results in poor scalability of the storage space. Therefore, in another implementation, functions of the control units 131 may be offloaded to a network interface card 104. In other words, in this implementation, the hard drive enclosure 130 does not include a control unit 131 inside, and instead, the network interface card 104 implements data reading/writing, address translation, and another computing function. In this case, the network interface card 104 is an intelligent network interface card. The intelligent network interface card may include a CPU and a memory. In some application scenarios, the network interface card 104 may also have a persistent memory medium, for example, a persistent memory (persistent memory, PM), a non-volatile random access memory (non-volatile random access memory, NVRAM), or a phase change memory (phase change memory, PCM). The CPU is configured to perform operations such as address translation and data reading and writing. The memory is configured to temporarily store data that is to be written into the hard drive 134, or read data that is to be sent to the controller from the hard drive 134. It may also be a programmable electronic component such as a data processing unit (data processing unit, DPU). The DPU has versatility and programmability of the CPU, but is more specialized, and can run efficiently on a network data packet, a storage request, or an analysis request. The DPU is distinguished from the CPU by a high degree of parallelism (which requires processing a large quantity of requests). Optionally, the DPU herein may alternatively be replaced with a processing chip such as a graphics processing unit (graphics processing unit, GPU) or embedded neural-network processing units (neural-network processing units, NPU). There is no belonging relationship between the network interface card 104 and the hard drive 134 in the hard drive enclosure 130. The network interface card 104 may access any hard drive 134 in the hard drive enclosure 130. Therefore, it is convenient to expand the hard drive when the storage space is insufficient.

According to a type of communication protocol between the engine 121 and the hard drive enclosure 130, the hard drive enclosure 130 may be an SAS hard drive enclosure, an NVMe hard drive enclosure, an IP hard drive enclosure, or another type of hard drive enclosure. The SAS hard drive enclosure uses the SAS 3.0 protocol. Each enclosure supports 25 SAS hard drives. The engine 121 is connected to the hard drive enclosure 130 by an onboard SAS interface or a SAS interface module. The NVMe hard drive enclosure is more like a complete computer system. An NVMe drive is inserted into the NVMe hard drive enclosure. The NVMe hard drive enclosure is connected to the engine 121 by an RDMA port.

It should be understood that the application scenario shown in FIG. 1 is merely an example for understanding. The technical solutions in embodiments of this application are also applicable to another type of storage system, for example, a storage system in a hard drive-controller integrated architecture, a storage system in a hard drive-controller separated architecture, or a distributed storage system.

For ease of understanding the technical solutions of this application, the following briefly describes concepts or technologies related to this application.

First, unstructured data refers to data that has an irregular or incomplete data structure, that has no predefined data model, and that is inconvenient to represent using a database or a two-dimensional logic table.

Second, tiered storage means that the storage system uses different storage methods based on indicators of stored data, such as an importance, an access frequency, a retention time, and a capacity, to store the data respectively in storage devices with different performance.

Third, a compression ratio refers to a ratio of a data size before compression to a data size after the compression. It is one of the main indicators evaluating quality of a compression algorithm.

Fourth, re-compression refers to further compression of data stored in a fixed format. Generally, after steps, such as decoding and restoration, are performed on the data stored in the fixed format, a new algorithm is used to re-compress the data, to reduce storage space.

It should be understood that, before storing data, a user usually perform data compression to save storage space. Data compression refers to a technology that reduces an amount of data, to improve efficiency of data transmission, storage, and processing without losing useful information, or reorganizes data to reduce data redundancy and storage space according to a specific method.

Generally, different types of unstructured data usually use different storage formats (or encapsulation formats). For example, office document data is usually stored in PDF, ZIP, or the like, and compressed in DEFLATE, LZW, or the like. Image data is usually stored in TIFF, PNG, or JPEG, or the like, and compressed in DEFLATE, JPEG, WEBP, or the like. Audio and video data is usually stored in MPEG, AVI, RMVB, or the like, and compressed in MPEG4, H264, H265, or the like.

Data may be classified into hot data or cold data based on an access frequency within a period of time. The hot data refers to online data that needs to be frequently accessed by computing nodes, for example, may be data that is within half a year and that is frequently queried by users. The cold data refers to offline data that is not frequently accessed, for example, backup data for disaster recovery, or data that needs to be retained for a period of time in compliance with the laws and regulations, for example, enterprise backup data, service and operation logs, call detail records, and statistical data.

The hot data and the cold data are stored in different methods in the storage system. Currently, the storage system widely uses a tiered storage technology to store data in a tiered manner. This not only reduces space occupied by non-important data in a tier 1 local disk, but also improves storage performance of the entire system. In addition, the storage system further classifies the data, and then stores a type of data with higher access frequency in a high-performance storage device, and stores a type of data with lower access frequency in a low-performance storage device, to reduce storage costs. It should be noted that most data in the unstructured data belongs to the type of data with lower access frequency.

For the low-frequency access data, an algorithm with a higher compression ratio may be generally selected to compress the data, to save the storage space. However, in an actual application, a user generally compresses the data before storing the data, but existing compression algorithms are mainly designed for data that is not compressed. Designing a re-compression algorithm for data that has been compressed not only is difficult, but also brings fewer benefits. Data after being re-compressed may even increase in size.

Currently, a technical solution to re-compressing data that has been compressed is generally to restore, to a specific extent, the data that has been compressed, and re-compress the restored data on this basis.

Figure 2A:
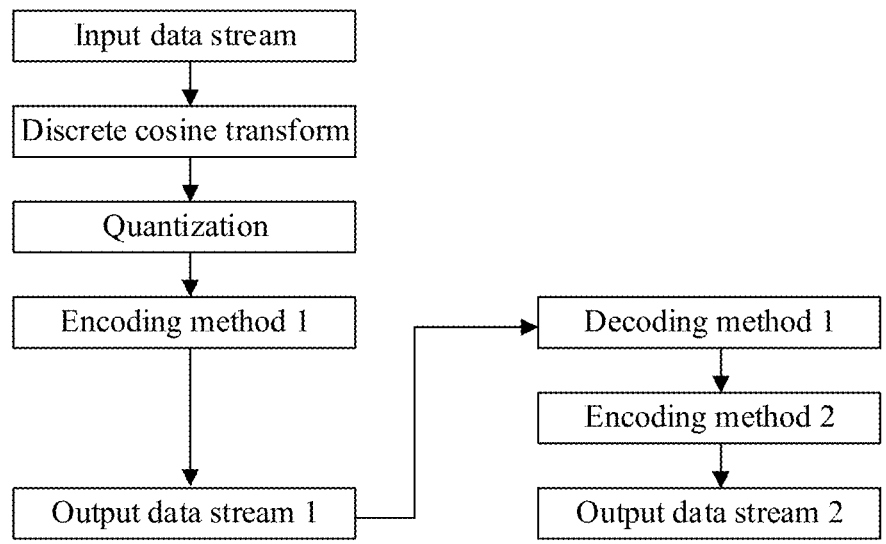
FIG. 2(a), FIG. 2(b), and FIG. 2(c) are a schematic diagram of an existing data processing method.
Figure 2B:
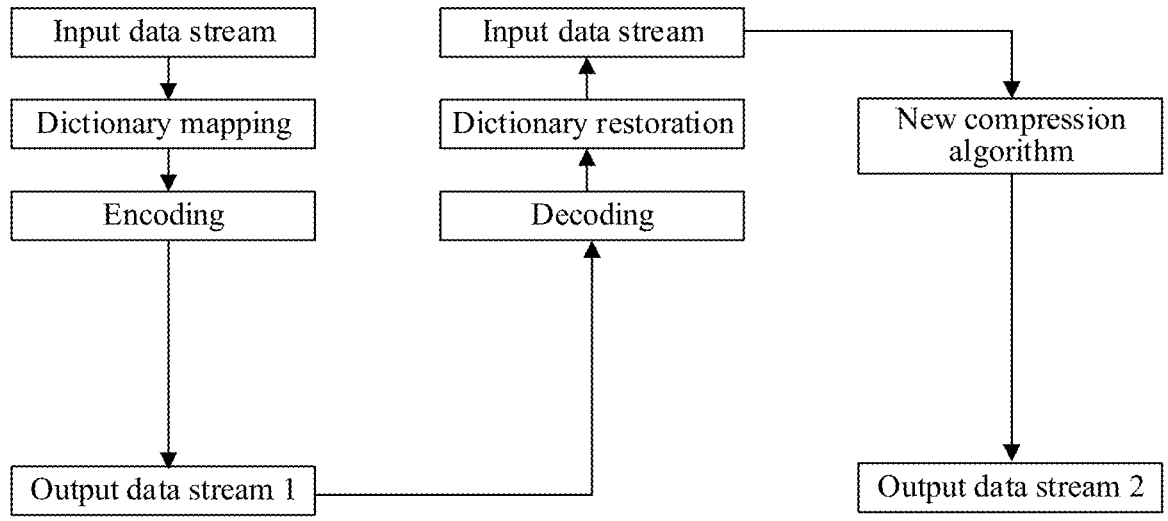
Figure 2C:
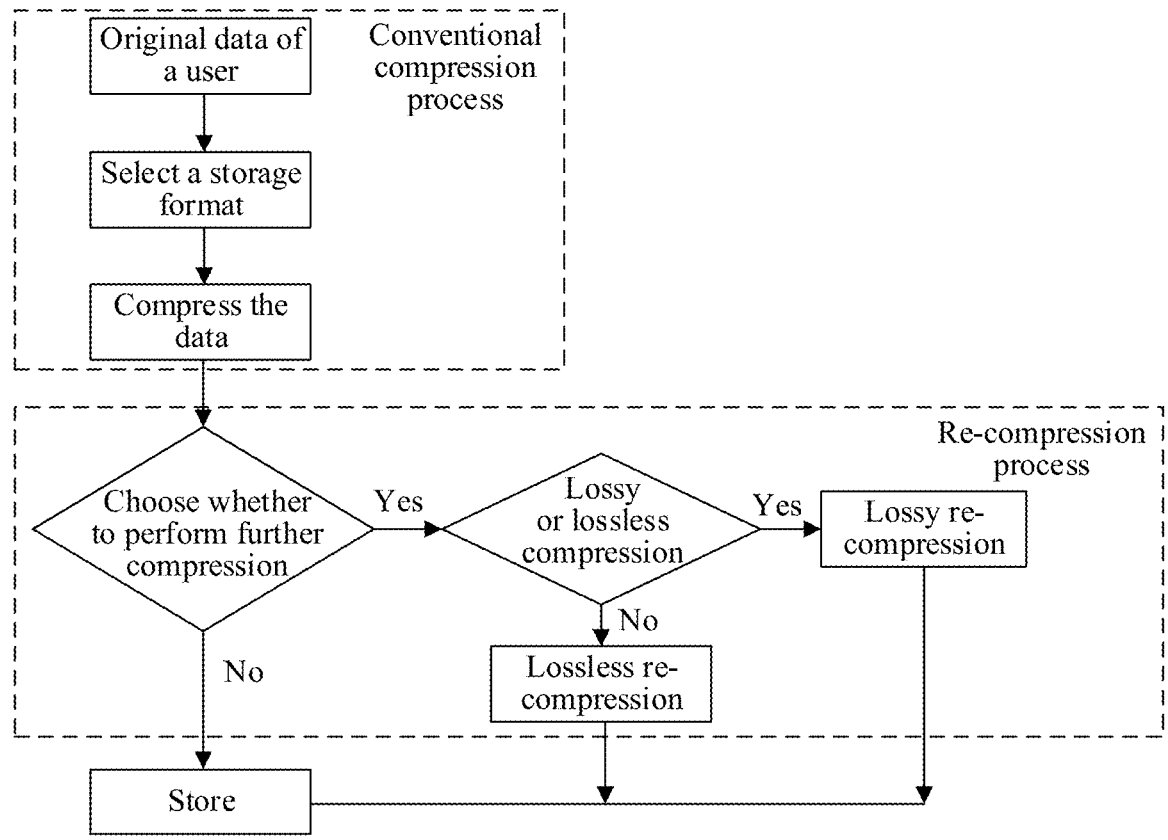

FIG. 2(*a*), FIG. 2(*b*), and FIG. 2(*c*) show an existing data re-compression method. FIG. 2(*a*) shows a procedure of a re-compression method for JPEG image data. In the re-compression method, data that has been compressed is mainly re-compressed by replacing an original encoding method. In other words, as shown in FIG. 2(*a*), a data stream 1 is restored to a degree of an encoding method 1. Then, an encoding method 2 is selected to re-encode the data, and then a data stream 2 is output. FIG. 2(*b*) shows a procedure of a re-compression method for DEFLATE data, to be specific, as shown in FIG. 2(*b*), a data stream 1 is restored to a degree of original input data. Then a new compression algorithm is selected to re-compress the original input data, and then a data stream 2 is output. FIG. 2(*c*) shows a conventional data re-compression process. Specifically, after obtaining original data (data that is not compressed), a user first selects a storage format, such as TIFF, PDF, JPEG, or MPEG, and then compresses the data using a compression algorithm selected by the user or specified by the storage format and stores the data. If the user wants to further compress the data, the user needs to select a lossy or lossless compression algorithm based on an importance of the data and select a matching storage format for storing the data after re-compressing the data.

The existing re-compression framework based on the unstructured data has the following features.

(1) The framework is related to a specific compression algorithm, for example, re-compression of JPEG image data or re-compression of DEFLATE-compressed data.

(2) A user generally needs to participate in a data re-compression process, and data loss may be caused by the user's lack of professional knowledge or mistakes.

(3) The framework is independent of the storage system.

Therefore, an existing data re-compression method cannot meet re-compression requirements of different types of unstructured data. In addition, a user still needs to choose whether to re-compress data, select which data is to be re-compressed, and select a re-compression method, a re-compression algorithm, or the like. However, most users usually lack knowledge about data compression and storage. This brings a great challenge to the users.

In view of the foregoing technical problems, this application provides a data processing method and apparatus. By providing a framework for re-compressing unstructured data, this application can meet re-compression requirements of a user for different types of unstructured data without requiring the user to participate in a data re-compression process. This helps the user easily save storage space.

Figure 3:
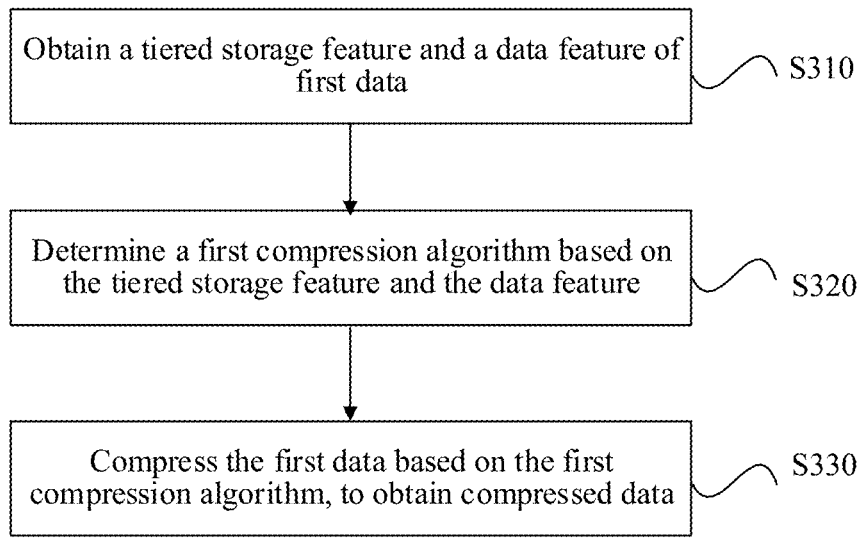
FIG. 3 is a schematic diagram of a data processing method according to this application.

FIG. 3 shows a data processing method according to this application. The method is applied to a storage system. The storage system includes a storage apparatus and a processing apparatus. This method is performed by the processing apparatus. Specific content is shown in FIG. 3.

It should be noted that, in this embodiment of this application, first stored data includes first data and first metadata. The first metadata is related information describing the first data. The first data is user data with substantive content. The first stored data is a data form obtained after the storage system performs specific processing on the first data and stores the first data. The first data may be data that has been compressed, or may be data that is not compressed. This is described herein in a unified manner, and details are not described below again.

S310: Obtain a tiered storage feature and a data feature of first data.

The tiered storage feature includes at least one of the following features: an importance, an access frequency, or a retention time. The data feature includes at least one of the following features: a data type, a data dimension, a data size, or a data content feature.

It should be understood that the first data represents user data with substantive content. When the user stores the first data in the storage system, the storage system determines the tiered storage feature of the first data based on information such as a data importance, the access frequency, and the retention time. The tiered storage feature can be for selecting a compression algorithm applicable to the first data.

It should be understood that the data dimension refers to information, such as a length, a width, and a height, of the first data. The data type refers to a type of first data, including information such as an integer type, a floating point number type, or a character type. The data content feature refers to feature information of the first data, and the data content feature is related to a feature analysis method that is used.

For example, the analysis method for the data content feature of the first data includes at least one of the following: statistical analysis, principal components analysis (PCA), cluster analysis, hypothesis testing, and the like.

It should be understood that the data content features of the first data are different based on different analysis methods. For example, when being based on the statistical analysis, the data content feature of the first data mainly refers to a data distribution, a mean value, a variance, and the like obtained through fitting. When being based on covariance analysis, the data content feature of the first data mainly refers to a correlation degree between different dimensions. When being based on the PCA, the data content feature of the first data mainly refers to several important dimensions in the obtained data. Other analysis methods include the hypothesis testing, the cluster analysis, and the like.

The apparatus is connected to the storage system (or a tiered storage system) to obtain the tiered storage feature configured by the storage system for the first data, so that the apparatus can sift, based on the tiered storage feature, the compression algorithm applicable to the first data.

Specifically, because the apparatus is directly connected to the storage system, an upper-layer application/the user is unaware in an entire data re-compression process, and does not need to perform an additional operation. This reduces pressure of the user.

It should be understood that the tiered storage feature configured by the storage system for the first data not only can be for determining whether the first data needs to be re-compressed, but also can be for determining a degree of re-compression that is performed on the first data, that is, can be for determining a performance requirement that the compression algorithm needs to meet for re-compressing the first data, for example, a throughput and a compression ratio.

It should be noted that, if the tiered storage feature configured by the storage system for the first data includes a plurality of features, for example, the access frequency, the importance, and the retention time, of the first data, the apparatus can weight the plurality of features included in the tiered storage feature of the first data, to obtain a comprehensive score evaluating the first data, or determine a comprehensive performance requirement parameter, and determine, based on the comprehensive score or the performance requirement parameter, whether the first data needs to be re-compressed, and determine a degree to which the first data is re-compressed.

It should be further understood that the apparatus obtains the first metadata by restoring the first stored data to a specific degree, obtains the first data based on the first metadata, obtains partial data feature information of the first data based on the first metadata, and obtains the data content feature based on data content analysis on the first data. Therefore, the apparatus obtains data content feature information of the first data based on the first metadata and the first data. For example, the apparatus obtains the first metadata by parsing a storage format of the first stored data, and obtains the first data based on the first metadata.

It should be understood that the first data is generally presented in a form of a one-dimensional 8-byte array in the memory. Therefore, the first metadata needs to be used to describe the related information of the first data, for example, information, such as the data type, the size, the dimension, and the compression algorithm that is used, of the first data.

It should be understood that the storage format of the first stored data may be understood as follows. The first metadata and the first data are stored at a specified location in a specified manner, to obtain the first stored data. In other words, the storage format is a storage manner of the first metadata and the first data. For example, the tagged image file format (TIFF) mainly includes three parts: an image file header (IFH), an image file directory (IFD), and a directory entry (DE). The IFH records version information, a byte order, and an offset of a first IFD. The IFD records a quantity of DEs and offset addresses of the DEs. Each DE records information such as related first metadata information and a pointer pointing to specific first data.

S320: Determine a first compression algorithm based on the tiered storage feature and the data feature.

Specifically, that the apparatus determines the first compression algorithm based on the tiered storage feature and the data feature includes:
1. Determine a compression algorithm performance parameter based on the tiered storage feature.
2. Determine the first compression algorithm based on the compression algorithm performance parameter and the data feature.

Optionally, the compression algorithm performance parameter includes at least one of the following: a compression ratio or a throughput.

Specifically, the apparatus determines the compression algorithm performance parameter based on the tiered storage feature fed back by the storage system. In other words, a requirement that the compression algorithm applicable to the first data needs to meet is determined. In other words, a minimum compression and decompression throughput requirement of the compression algorithm is determined, and further, at least one compression algorithm that meets the compression algorithm performance parameter is determined. The apparatus determines the first compression algorithm based on the compression algorithm performance parameter and the data feature. The first compression algorithm needs to meet both the compression algorithm performance parameter and the data feature.

In a possible implementation, that the apparatus determines the first compression algorithm based on the tiered storage feature and the data feature includes:
A: Determine a first compression algorithm set based on the tiered storage feature, where the first compression algorithm set includes at least one compression algorithm.
B: Determine a second compression algorithm set based on the data feature, where the second compression algorithm set includes at least one compression algorithm.
C: Determine the first compression algorithm, where the first compression algorithm matches both the tiered storage feature and the data feature.

It should be understood that an intersection exists between the first compression algorithm set and the second compression algorithm set, and the first compression algorithm belongs to the intersection.

Specifically, the apparatus quantifies, by using parameters, such as the data importance, the access frequency, and the retention time, fed back by the storage system, these indicators into a minimum compression and decompression throughput or compression ratio requirement on the compression algorithm, to select the first compression algorithm set. In addition, the apparatus sifts the second compression algorithm set based on the data feature, and determines the intersection from the first compression algorithm set and the second compression algorithm set. The intersection includes at least one compression algorithm.

For example, the apparatus determines, based on the tiered storage feature, a first selection criterion of the compression algorithm, for example, the first selection criterion is a compression throughput condition, a reconstruction throughput condition and the like that the compression algorithm needs to meet; and determines, based on the data feature, a second selection criterion of the compression algorithm, for example, the second selection criterion is that the compression algorithm needs to support the data type, the dimension, and the like. The apparatus sifts one compression algorithm from a plurality of compression algorithms that meet the first selection criterion and the second selection criterion, to compress the first stored data.

In a possible implementation, the apparatus can sort the plurality of compression algorithms that meet both the tiered storage feature and the data feature, and select an optimal compression algorithm from the plurality of compression algorithms. An indicator of the sorting may include at least one of the following: the compression ratio, a compression throughput, a reconstruction throughput, or a feature matching degree.

In a possible implementation, the apparatus can perform data feature matching on the intersection between the first compression algorithm set and the second compression algorithm set to determine a third compression algorithm set, then sort the third compression algorithm set, where indicators of the sorting may be the listed indicator parameters, and then select an optimal compression algorithm from the third compression algorithm set. For example, the apparatus scores each compression algorithm based on degrees of matching between the compression algorithms and a feature analysis result, to obtain a batch of compression algorithms whose scores are higher than a score threshold.

It should be noted that the apparatus may determine the first compression algorithm based on both the tiered storage feature and the data feature, or may determine the first compression algorithm based on the tiered storage feature first, and then based on the data feature, or may determine the first compression algorithm based on the data feature first and then based on the tiered storage feature. A sequence is not limited in this embodiment of this application.

Through determining, based on the tiered storage feature, a performance requirement that the compression algorithm needs to meet, and with reference to the data feature, the first compression algorithm applicable to the first data can be better sifted in this application, so that the re-compression requirements of the plurality of types of unstructured data can be met. This avoids a disadvantage in a re-compression scheme related to a strong compression algorithm in the conventional technology. S330: Compress the first data based on the first compression algorithm, to obtain compressed data.

It should be understood that if the first data is compressed data, that the apparatus compresses the first data based on the first compression algorithm, to obtain the compressed data includes:

D: Decompress the first data to obtain intermediate data, and save a first operation parameter used during decompression.

E: Compress the intermediate data based on the first compression algorithm, to obtain the compressed data.

It should be understood that the intermediate data may include original data that is not compressed, or may be data obtained after decoding the first data. This depends on a degree to which the first data is decompressed. A specific form of the intermediate data is not limited in this application. It should be understood that the first operation parameter may be storage format information of the first data, first metadata information, or a related parameter of an original compression algorithm. The first operation parameter may be understood as information included in a process of parsing the first data. The information helps restore the intermediate data to the first data based on the first operation parameter after the first data is decompressed.

For example, for restoration to the first data, it needs to record a storage format selected by the user, whether the first data is compressed, and which compression algorithm is selected if the first data is compressed. When the first data is decompressed, a related parameter of the compression algorithm and the like need to be evaluated and recorded. When the compressed data is to be restored to the first data, the compressed data is first decompressed. Then the first operation parameter recorded in the parsing process is used to compress the intermediate data obtained through decompression, to obtain the first data.

Through the foregoing technical solutions, in this application, the first data is re-compressed without user participation, and the corresponding operation parameter is saved, so that when the user needs to call the first data, the compressed data can be restored to the first data. This avoids damage to the first data.

In a possible implementation, the apparatus decompresses the compressed data to obtain the intermediate data; and compresses the intermediate data based on the first operation parameter and then store the compressed intermediate data in an original storage format, to obtain the first data. In this way, this application supports restoring the compressed data to the first data, to avoid damage to the first data. In a possible implementation, the apparatus decompresses the compressed data to obtain the first data.

It should be understood that, the decompression process may be understood as directly decompressing the compressed data to obtain the first data, or may be a process of decompressing the compressed data, in which a plurality of steps need to be performed to obtain the first data.

In a possible implementation, before determining the first compression algorithm, the apparatus determines, based on the tiered storage feature, that the first data needs to be compressed.

In this application, the tiered storage feature of the first data is determined, and the first data is compressed only when it is determined that the first data needs to be compressed, to avoid compressing the first data when compression is not needed. In this way, a user does not need to choose whether the first data needs to be compressed. This further can help the user determine whether the first data needs to be compressed, thereby avoiding user participation.

In a possible implementation, the apparatus stores the compressed data in the storage apparatus. In this way, this application can reduce space occupied by the data storage.

The tiered storage feature and the data feature of the first data are obtained. The compression algorithm applicable to the first data is determined based on the foregoing features, and the first data is compressed based on the compression algorithm. In this way, in this application, the first data can be autonomously determined and compressed without requiring user participation, so that re-compression requirements of a plurality of types of unstructured data can be met. This helps the user easily save storage space.

Figure 4:
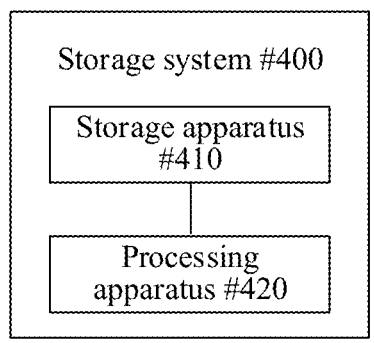
FIG. 4 is a schematic diagram of a data processing apparatus according to this application.

The following describes a storage system #400 according to this application with reference to FIG. 4. Specific content is shown in FIG. 4.

The storage system includes a storage apparatus #410 and a processing apparatus #420. The processing apparatus #420 is configured to perform the data processing method in the foregoing method embodiment.

In an illustrative description, the processing apparatus #420 can be configured to obtain a tiered storage feature and a data feature of first data; can further be configured to determine a first compression algorithm based on the tiered storage feature and the data feature; and can further be configured to compress the first data based on the first compression algorithm, to obtain compressed data.

It should be understood that the foregoing content is merely used as an illustrative description. For specific content, refer to the content in the foregoing method embodiment.

Figure 5:
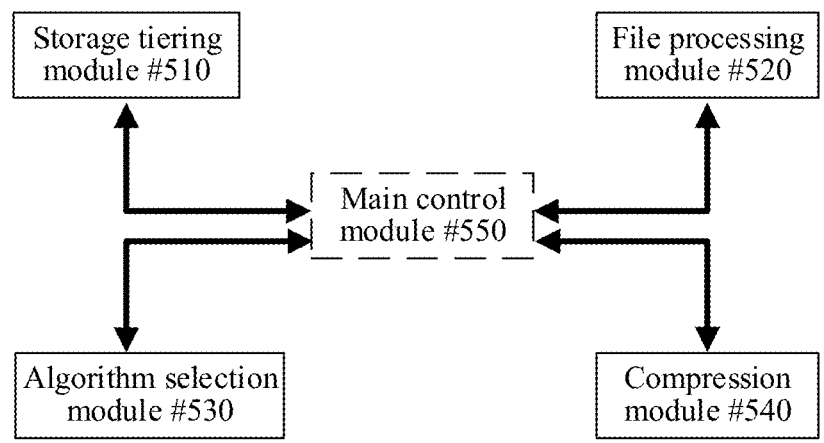
FIG. 5 is a schematic diagram of another data processing apparatus according to this application.

FIG. 5 is a schematic diagram of a data processing apparatus #500 according to this application. Content shown in FIG. 5 is a further description of the processing apparatus #420 shown in FIG. 4.

The processing apparatus #420 includes a storage tiering module #510, a file processing module #520, an algorithm selection module #530, and a compression module #540.

Optionally, the processing apparatus #420 further includes a main control module #550.

The following further describes functions of the modules.

The storage tiering module #510 is configured to obtain a tiered storage feature of first data. Specifically, the storage tiering module #510 is connected to the storage system, to obtain the tiered storage information of the first data in the storage system.

The file processing module #520 is configured to obtain data feature information of the first data, for example, a data type, a data dimension, a data size, and a data content feature. It should be understood that, in this embodiment of this application, the file processing module #520 has the following advantages.

(1) First stored data is parsed by using a unified parsing and reconstruction interface.

In the apparatus, the main control module #550 encapsulates a unified format parsing and reconstruction interface for format parsing algorithms to use, so that all the algorithms use the unified parsing and restoration interface. Due to the unified interface, the main control module #550 of the apparatus may call a specified algorithm through only a name of a format parsing algorithm, to decouple various format parsing algorithms from the main control module #550.

(2) The format parsing algorithms are compiled into independent dynamic libraries.

Because the format parsing algorithms have been decoupled from the main control module, in this application, the format parsing algorithms may be compiled into the independent dynamic libraries for the main control module to load and call.

(3) The first stored data is parsed to different degrees.

Because data is generally compressed before being stored, when re-compressing the first data, the apparatus needs to determine, based on an original compression manner and an alternative re-compression algorithm, whether to decompress the first data: 1. Data compressed through a specified algorithm can be re-compressed through the re-compression algorithm. In this case, in this application, only a format of the first stored data needs to be parsed to obtain the metadata and the first data. 2. The re-compression algorithm is for data that is not compressed. In this case, in this application, after the first data is obtained by parsing the format of the first stored data, the main control module #550 of the apparatus loads a corresponding original compression algorithm to decompress the first data, to obtain intermediate data.

(4) The compressed data can be accurately restored to the first data.

A compression algorithm usually has a plurality of optional parameters, such as a compression level and a prediction manner. Results obtained through compression differ based on different parameter combinations, but these parameters are generally not recorded during storage. Due to different selected compressor parameters, restored user data may differ from initial user data. Although data stored by a user is not lost, the user may consider that re-compression causes data loss due to a lack of knowledge of data compression and storage. To resolve this problem, if a user has compressed data before storing the data, when the user data is decompressed, in this application, parameter selections of a compressor are analyzed and recorded, so that during format restoration, the user data can be accurately restored based on the recorded parameters.

The algorithm selection module #530 is configured to determine the first compression algorithm based on the tiered storage feature and the data feature. A specific process is described in the foregoing method embodiment, and details are not described herein again.

It should be understood that, in this embodiment of this application, the algorithm selection module #530 can be used in the following scenarios.

(1) Self-adaptive selection of compression algorithms for different types of unstructured data There are many types of unstructured data, and different types of data features differ greatly. Except for some general compression algorithms that may support different types of data compression, most compression algorithms are generally applicable only to data of a specified type. For example, WEBP is for compression of image data, and H264 is for compression of video data. Therefore, in this application, adaptive compression algorithms can be selected for compressors of different types of unstructured data.

(2) Self-adaptive selection of compression algorithms for a same type of unstructured data For a same type of unstructured data, a general compression algorithm and a compression algorithm corresponding to the type may be generally used, but compression ratios of different types of compression algorithms may differ greatly. For example, for a remote sensing image, a compression ratio of a general compression algorithm LZW may be 1.5 in lossless compression, a compression ratio of a general image compression algorithm WEBP may be 3.0, and a compression ratio of JPEG-LS may reach 5.0 or higher. Therefore, the algorithm selection module #530 in this application supports selecting a compression algorithm that best matches an overall data feature and a performance requirement of the first data.

(3) Adaptive selection of compression algorithms corresponding to parts of large data after division Large data is usually divided into several independent data blocks during compression, and then each data block is compressed. In this case, a same compression algorithm is used for the data blocks. Actually, features of different parts of complete data may differ greatly. For example, in an image of a character, the character is usually located in a middle area of the image, and the surrounding in the image generally greatly differs from the character. By dividing the data in advance, the algorithm selection module #530 in this application may select different compression algorithms for different data blocks, thereby improving an overall compression ratio.

The compression module #540 is configured to re-compress the first data using the first compression algorithm, to obtain the compressed data.

It should be understood that, in this embodiment of this application, the compression module #540 is responsible for data compression and data decompression. The compressor module #540 has the following features:

(1) All compressors use a unified compression and decompression interface.

This application supports the main control module #550 to encapsulate a unified compression and decompression interface for compressors to use, so that all the compressors use the unified compression and decompression interface. Due to the unified interface, the main control module #550 may call a specified compressor through only a name of the compressor, to decouple the compressors from the main control module #550.

(2) The compressors are compiled into independent dynamic libraries.

Because the compressors have been decoupled from the main control module #550, this application supports compiling the compressors into the independent dynamic libraries, which is convenient for the main control module #550 to load and call. The independent compilation of the compressors has the following advantages:

Because the compressors are independent of each other, the upgrade, the maintenance, and the like of a specific compressor do not affect another compressor. The compressors may evolve independently to achieve decoupling inside the compressor module.

Adding a new compression algorithm and discarding an old compression algorithm do not affect another compression algorithm or the data re-compression apparatus, which helps extend a new function of the compression module #540.

When data is re-compressed in a specific scenario, only a corresponding compressor needs to be loaded, so that a lightweight system is implemented.

The main control module #550 is responsible for command line parameter parsing, multi-thread scheduling, file processing, and algorithm loading and calling corresponding to a compression algorithm module. The main control module #550 has the following features:

(1) Unified compression algorithm calling interface

To call different compressors in a unified manner, some parameters included in the compressors are extracted first, for example, input and output data streams and information such as the data dimension, the type, and the length. Some parameters specific to the compressors, for example, a level for controlling a compression ratio or speed and a prediction method, can be input by specifying a default value, self-adaptive selection of an algorithm, or command line input. With reference to a relationship between to a base class and a derived class in programming, the main control module #550 provides a unified base class, including various common parameters and to-be-implemented methods for parameter parsing, compressing, decompressing, and the like. The compression algorithms rewrite an inherited method based on their own features, thereby decoupling the main control module #550 from the compressor module and calling different compression algorithms in a unified manner.

(2) Unified format calling interface (3) Thread pool and multi-thread scheduling To fully utilize computing resources, in this application, a thread pool may be added to the main control module #550. Then, tasks, including format parsing and restoration, data compression and decompression, and the like, that can be processed in parallel are allocated to threads for processing, so that overall re-compression efficiency is improved.

(4) Estimation of compression ratios and throughputs of compressors in common scenarios Because there are many compressors integrated in the system, the main control module #550 needs to preliminarily sift the compressors based on a type of the data and features of the compressors. The type of the data may be generally obtained based on related information such as the metadata, but it is difficult to obtain related indicators of the compressors, for example, the compression ratios, compression throughputs, and decompression throughputs. Performance on various types of datasets may be estimated based on previous test results, and the estimated results are stored in a location accessible to the main control module #550. When the data is re-compressed, the previous pre-evaluation results may be dynamically updated. When some data needs to be re-compressed, with reference to the results, the main control module #550 loads one or more related compressors for selection and use.

It should be understood that the foregoing descriptions of modules are merely example descriptions, and the modules are configured to perform the steps in the foregoing method embodiments. For specific content, refer to the foregoing descriptions. Details are not described herein again.

An embodiment of this application provides a computer-readable storage medium, storing instructions. When the instructions are run on a computer, the computer is enabled to perform the data processing method performed by the processing apparatus in the foregoing method embodiment.

An embodiment of this application provides a computer program product. When the computer program product is run on a computer, the computer is enabled to perform the data processing method performed by the processing apparatus in the foregoing method embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated based on figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate through a local and/or remote process and based on, for example, a signal having one or more data packets (for example, data from two components interacting with another component in a local system, a distributed system, and/or across a network such as the Internet interacting with other systems based on the signal).

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard drive, a read-only memory (ROM), a random access memory (RAM), a magnetic drive, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data processing method performed by a processing apparatus of a storage system, the method comprising:
   obtaining a tiered storage feature and a data feature of first data, wherein the tiered storage feature comprises at least one of the following features: an importance, an access frequency, or a retention time, and the data feature comprises at least one of the following features: a data type, a data dimension, a data size, or a data content feature;
   determining a first compression algorithm based on the tiered storage feature and the data feature; and
   compressing the first data based on the first compression algorithm, to obtain compressed data, wherein the first data is data that has been compressed, and the compressing the first data comprises:
   decompressing the first data to obtain intermediate data;
   saving a first operation parameter used during the decompression; and
   compressing the intermediate data based on the first compression algorithm, to obtain the compressed data.

2. The method of claim 1, wherein the determining the first compression algorithm based on the tiered storage feature and the data feature comprises:
   determining a compression algorithm performance parameter based on the tiered storage feature; and
   determining the first compression algorithm based on the compression algorithm performance parameter and the data feature.

3. The method of claim 2, wherein before the determining the first compression algorithm, the method further comprises:
   determining, based on the tiered storage feature, that the first data needs to be compressed.

4. The method of claim 2, wherein the compression algorithm performance parameter comprises at least one of the following: a compression ratio or a throughput.

5. The method of claim 1, the method further comprising:
   decompressing the compressed data to obtain the intermediate data; and
   compressing the intermediate data based on the first operation parameter, to obtain the first data.

6. The method of claim 1, the method further comprising:
   decompressing the compressed data to obtain the first data.

7. The method of claim 1, the method further comprising:
   storing the compressed data in the storage apparatus.

8. A non-transitory computer-readable storage medium, storing instructions, wherein when the instructions are run on a computer, the computer is enabled to perform a data processing method comprising:
   obtaining a tiered storage feature and a data feature of first data, wherein the tiered storage feature comprises at least one of the following features: an importance, an access frequency, or a retention time, and the data feature comprises at least one of the following features: a data type, a data dimension, a data size, or a data content feature;
   determining a first compression algorithm based on the tiered storage feature and the data feature; and
   compressing the first data based on the first compression algorithm, to obtain compressed data, wherein the first data is data that has been compressed, and the compressing the first data comprises:
   decompressing the first data to obtain intermediate data;
   saving a first operation parameter used during the decompression; and
   compressing the intermediate data based on the first compression algorithm, to obtain the compressed data.

9. The non-transitory computer-readable storage medium of claim 8, wherein the determining the first compression algorithm based on the tiered storage feature and the data feature comprises:
   determining a compression algorithm performance parameter based on the tiered storage feature; and
   determining the first compression algorithm based on the compression algorithm performance parameter and the data feature.

10. The non-transitory computer-readable storage medium of claim 9, wherein before the determining the first compression algorithm, the method further comprises:
    determining, based on the tiered storage feature, that the first data needs to be compressed.

11. The non-transitory computer-readable storage medium of claim 8, wherein the method further comprises:
    decompressing the compressed data to obtain the intermediate data; and
    compressing the intermediate data based on the first operation parameter, to obtain the first data.

12. The non-transitory computer-readable storage medium of claim 8, wherein the method further comprises:
    decompressing the compressed data to obtain the first data.

13. A computer device, wherein the computer device comprises a processor and a memory;
    the memory is configured to store computer program instructions; and
    the processor executes the computer program instructions in the memory to perform a method comprising:
    obtaining a tiered storage feature and a data feature of first data, wherein the tiered storage feature comprises at least one of the following features: an importance, an access frequency, or a retention time, and the data feature comprises at least one of the following features: a data type, a data dimension, a data size, or a data content feature;
    determining a first compression algorithm based on the tiered storage feature and the data feature; and
    compressing the first data based on the first compression algorithm, to obtain compressed data, wherein the first data is data that has been compressed, and the compressing the first data comprises:
    decompressing the first data to obtain intermediate data;
    saving a first operation parameter used during the decompression; and
    compressing the intermediate data based on the first compression algorithm, to obtain the compressed data.

14. The computer device of claim 13, wherein the determining the first compression algorithm based on the tiered storage feature and the data feature comprises:
    determining a compression algorithm performance parameter based on the tiered storage feature; and determining the first compression algorithm based on the compression algorithm performance parameter and the data feature.

15. The computer device of claim 14, wherein before the determining the first compression algorithm, the method further comprises:

determining, based on the tiered storage feature, that the first data needs to be compressed.

16. The computer device of claim 14, wherein the method further comprises:

decompressing the compressed data to obtain the intermediate data; and compressing the intermediate data based on the first operation parameter, to obtain the first data.

17. The computer device of claim 13, wherein the method further comprises:

decompressing the compressed data to obtain the first data.

* * * * *